US012783635B2

(12) United States Patent
Vasudevan

(10) Patent No.: US 12,783,635 B2
(45) **Date of Patent: *Nov. 3, 2026**

(54) SYSTEM AND METHOD FOR PROVIDING PROVABLE END-TO-END GUARANTEES ON COMMODITY HETEROGENEOUS INTERCONNECTED COMPUTING PLATFORMS

(71) Applicant: CARNEGIE MELLON UNIVERSITY, Pittsburgh, PA (US)

(72) Inventor: Amit Vasudevan, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 14 days.

This patent is subject to a terminal disclaimer.

(21) Appl. No.: 19/053,572

(22) Filed: Feb. 14, 2025

(65) Prior Publication Data

US 2025/0355988 A1 Nov. 20, 2025

Related U.S. Application Data

(63) Continuation of application No. 18/623,417, filed on Apr. 1, 2024, now Pat. No. 12,248,558, which is a continuation of application No. 17/683,786, filed on Mar. 1, 2022, now Pat. No. 12,093,367.

(60) Provisional application No. 63/274,051, filed on Nov. 1, 2021, provisional application No. 63/214,345, filed on Jun. 24, 2021, provisional application No. 63/183,291, filed on May 3, 2021.

(51) Int. Cl.

| | |
|---|---|
| ***G06F 21/44*** | (2013.01) |
| ***G06F 9/48*** | (2006.01) |
| ***G06F 11/3604*** | (2025.01) |
| ***G06F 21/60*** | (2013.01) |

(52) U.S. Cl.

CPC ........... *G06F 21/44* (2013.01); *G06F 9/4812* (2013.01); *G06F 11/3608* (2013.01); *G06F 21/602* (2013.01); *G06F 2221/2141* (2013.01)

(58) Field of Classification Search

CPC .... G06F 21/44; G06F 9/4806; G06F 11/3608; G06F 21/602; G06F 21/60; G06F 2221/2141

See application file for complete search history.

(56) References Cited

U.S. PATENT DOCUMENTS

| | | | |
|---|---|---|---|
| 8,627,414 | B1 | 1/2014 | Mccune et al. |
| 9,077,520 | B2 | 7/2015 | Garcia Morchon et al. |
| 9,898,395 | B2 | 2/2018 | Adir et al. |
| 10,230,571 | B2 | 3/2019 | Rangasamy et al. |
| 10,326,749 | B2 | 6/2019 | Linton et al. |

(Continued)

OTHER PUBLICATIONS

Vasudevan et al., "überSpark: Enforcing Verifiable Object Abstractions for Automated Compositional Security Analysis of a Hypervisor," In Proceedings of the 25th USENIX Security Symposium, pp. 87-104 (Aug. 10-12, 2016), Austin TX.

*Primary Examiner* — Hosuk Song

(74) *Attorney, Agent, or Firm* — KDW FIRM PLLC

(57) ABSTRACT

Disclosed herein is a system architecture that structures commodity heterogeneous interconnected computing platforms around universal object abstractions, which are fundamental system abstractions and building blocks that provides practical and provable end-to-end guarantees of security, correctness, and timeliness for the platform.

20 Claims, 6 Drawing Sheets

(56) References Cited

U.S. PATENT DOCUMENTS

| | | | | |
|---|---|---|---|---|
| 10,333,713 | B2 | 6/2019 | Linton et al. | |
| 10,356,076 | B2 | 7/2019 | Helsen et al. | |
| 10,469,475 | B2 | 11/2019 | Helsen et al. | |
| 10,915,642 | B2 * | 2/2021 | Linton | G06F 21/602 |
| 11,409,880 | B2 | 8/2022 | Huang et al. | |
| 11,473,913 | B2 | 10/2022 | Koubaa | |
| 11,483,154 | B2 | 10/2022 | Kannan et al. | |
| 11,687,665 | B2 | 6/2023 | Vinayagamurthy et al. | |
| 11,777,932 | B1 * | 10/2023 | Kempf | H04L 63/20<br>726/4 |
| 11,892,946 | B2 | 2/2024 | Bahirat | |
| 12,003,660 | B2 * | 6/2024 | Bernardi | H04L 67/104 |
| 12,093,367 | B2 | 9/2024 | Vasudevan | |
| 12,248,558 | B2 * | 3/2025 | Vasudevan | G06F 9/4812 |
| 12,333,228 | B1 * | 6/2025 | Roper, Jr. | G06F 8/71 |
| 2023/0216947 | A1 | 7/2023 | Bernardi | |

* cited by examiner

SYSTEM AND METHOD FOR PROVIDING PROVABLE END-TO-END GUARANTEES ON COMMODITY HETEROGENEOUS INTERCONNECTED COMPUTING PLATFORMS

RELATED APPLICATIONS

This application is a continuation of U.S. patent application Ser. No. 18/623,417, filed Apr. 1, 2024, which is a continuation of U.S. patent application Ser. No. 17/683,786, filed Mar. 1, 2022, which claims the benefit of U.S. Provisional Patent Applications Nos. 63/183,291, filed May 3, 2021, 63/214,345, filed Jun. 24, 2021, and 63/274,051, filed Nov. 1, 2021. The contents of each of these applications are incorporated herein in their entireties.

GOVERNMENT INTEREST

This invention was made with the support of the U.S. Government under contract FA8702-15-D-0002, awarded by the Air Force Life Cycle Management Center. The U.S. Government has certain rights in this invention.

BACKGROUND

Commodity heterogeneous interconnected computing (CHIC) platforms encompass laptops, mobile phones, IoT devices, robots, drones, and self-driving cars. Such platforms redefine the way we interact not only for convenience (e.g., regulating home temperature and lighting, ordering groceries, etc.) but increasingly for critical applications as well (e.g., autonomous driving, home security, health care, etc.). Consequently, CHIC platforms demand fairly strong end-to-end guarantees for security, correctness, and timeliness.

Formal verification is a powerful tool for realizing provable guarantees. The system complexity of today's CHIC platform (with a plethora of heterogeneous platforms, configurations, and interactions) is rapidly outpacing the arsenal of current verification tools, most of which focus solely on specific styles of properties and verification methodologies. Competitive markets with low cost of entry, little regulation, and no liability will continue to produce innovative, attractively priced, continuously evolving interconnected computing platforms comprising diverse-origin, disparate hardware and large (untrustworthy) software components. This makes achieving practical and provable end-to-end guarantees on CHIC platforms very challenging.

SUMMARY

Disclosed herein is a system architecture that structures the CHIC platform around Universal Object Abstractions (referred to herein as "u-objects"), a modular provable object and building block that provides practical and provable end-to-end guarantees of security, correctness, and timeliness.

The invention is designed to be realizable on heterogeneous hardware platforms with disparate capabilities and facilitates compositional end-to-end reasoning and efficient implementation. The invention also supports the use of multiple verification techniques towards properties of different flavors, for development compatible, incremental verification, co-existing and meshing with unverified components, at a fine granularity, and wide applicability to all layers of the CHIC platform.

The present invention achieves the following goals: (1) Provable End-to-End Guarantees—The invention produces a service where guarantees are formally verifiable, end-to-end, with machine-checkable proofs of those guarantees on the software implementation running on top of the actual CHIC platform hardware; (2) Practicality—The verification overhead is minimal both from a construction-time and run-time perspective. The solution presented herein is development compatible (evolvable with iterative versions), power-efficient, and performant; and (3) Implementation Generality—The implementation uses existing components to the extent possible, rather than building new hardware, implementing new software on top of it, and mounting a new verification effort. All of the aforementioned activities are very expensive.

The system of the present invention provides one or more of functional guarantees, security guarantees, timing guarantees and information flow guarantees. The invention provides the ability to produce a service wherein guarantees are formally verifiable, end-to-end, with machine-checkable proofs of those guarantees on the software implementation running on top of the actual CHIC platform hardware. Additionally, to be practical, the verification overhead is minimal both from a construction-time and run-time perspective. Lastly, the invention uses existing components to the extent possible, rather than building new hardware, implementing new software, and mounting a new verification effort.

DETAILED DESCRIPTION

The details of the invention will be described in the context of an exemplary CHIC service for elders living in an assisted-care facility, referred to herein as "ElderSafe". As would be realized, the invention is not meant to be limited by the exemplary embodiment.

Figure 1:
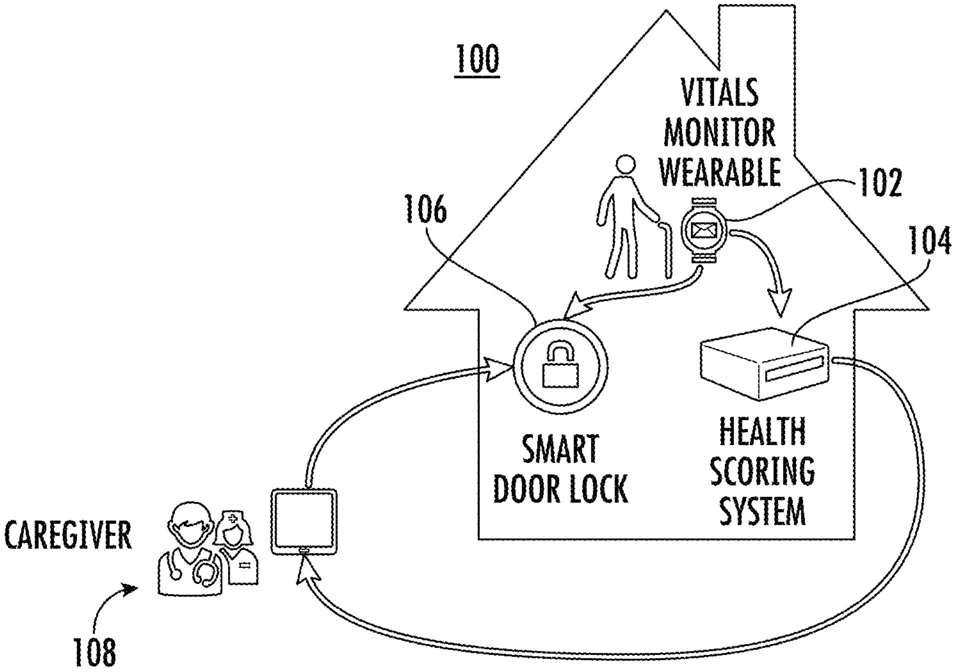
FIG. 1 is a block diagram of an exemplary CHIC system to which the invention may be applied to provide the required guarantees.

A block diagram of the ElderSafe system 100 is shown in FIG. 1. For the purposes of explaining the invention, the ElderSafe service 100 is limited to a simple task: collecting readings of vital signs from the subject via a wearable vitals monitor 102, for example, a wrist sensor, analyzing those readings to classify them as normal or abnormal (i.e., requiring assistance) using a health scoring system 104, and, in the latter case, authorizing staff to unlock the door of the residence of the subject using smart lock 106 to allow assisting the subject, even if the door is locked.

An illustrative, concrete ensemble of devices providing the ElderSafe service include a wearable vitals monitor 102, an automated early-warning health-scoring system 104 to predict the likelihood of mortality, an event-management system 108 that runs on the caregiver phone or tablet and a commercially-available smart lock 106 on the subject's entry door. It should be noted that these systems are all commodity, commercially-available components, thereby meeting one of the objectives of the invention mentioned in the Summary section above.

ElderSafe is an example of one of the services that may be offered in a typical, smart semi-independent assisted-care facility. To be useful, ElderSafe must provide a number of guarantees of different types, including, for example: (1) functional guarantees (e.g., unlock the door only when an emergency is detected); (2) security guarantees (e.g., only authorized staff/nurses can unlock the door in a detected emergency wherein only the subject's wearable can trigger unlocking of that subject's door and only genuine instances of the wearable device operating under a known configuration can trigger unlocking of the door); (3) timing guarantees (e.g., worst-case response time between detection of an emergency event and the responsive action of unlocking the door is under 5 minutes); and (4) information-flow guarantees (e.g., no information about unrelated readings of the wearable, or the subject's comings and goings detected via the door lock should be available to the staff or the outside world).

Such guarantees, strongly enforced, are essential to ensure deployability, regulatory compliance, and to be an effective tool to service residents of the assisted-care facility. Note that, although ElderSafe is of limited complexity, it serves to illustrate a typical CHIC platform application comprising heterogeneous hardware, software, and properties that make achieving practical and provable end-to-end guarantees on the CHIC platform very challenging.

Figure 2:
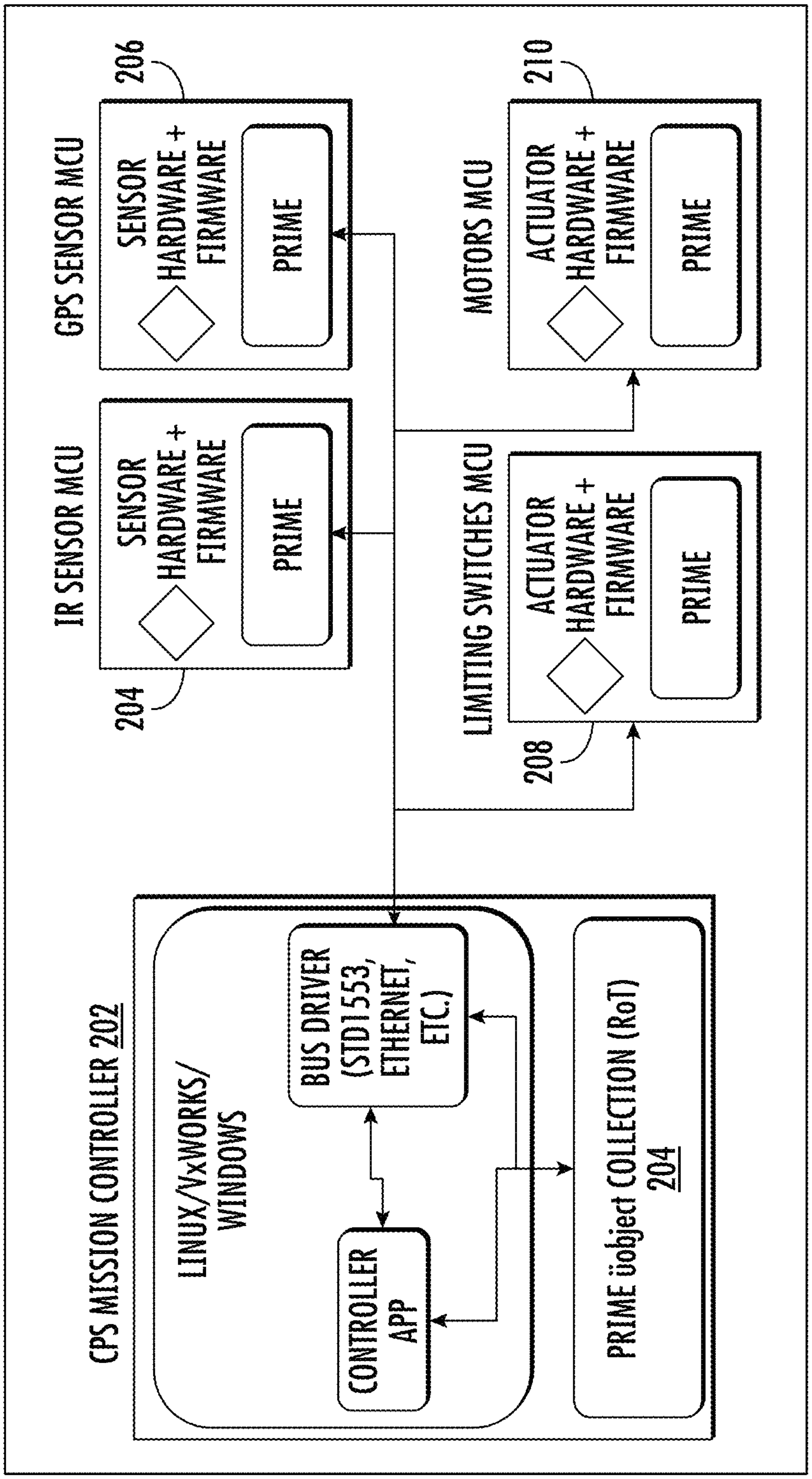
FIG. 2 is a block diagram showing a generic CHIC-centric cyber physical system to which the invention may be applied to provide the required guarantees.

The architecture can be cast in the context of a generalized CHIC-centric Cyber Physical System (CPS) platform, as shown in FIG. 2. Heterogenous compute platforms can now be used with a CPS mission controller 202, and a variety of sensor MCUs (e.g., IR Sensor 204, GPS sensor 206) and actuator MCUs (e.g., limiting switches 208, motors 210), as shown in FIG. 2. The mission controller 202 employs collections of prime u-objects (discussed below) which act as the roots-of-trust on these platforms. U-objects are instantiated for desired components towards a guarantee. This example shows an end-to-end guarantee between sensors, mission controller and actuators. The u-objects are implemented and verified separately and incrementally and are composed together to ensure guarantees between the CPS app, sensor/actuator drivers, roots-of-trust and sensor/actuator hardware as shown for an IR sensor 204, GPS sensor 206, limiting switch actuator 208 and motor actuator 210 in FIG. 2.

With respect to ElderSafe and other services to which the invention will apply, it should be noted that the various components (i.e., the vitals monitor 102, the health-scoring platform 104, the smart lock 106, and the caregiver tablet 108) are distinct physical hardware platforms. Therefore, the invention must be able to ensure that the service can accommodate physically distinct hardware components and be meaningfully distributed across them. Further, the ElderSafe service comprises disparate hardware architectures for each of the distinct hardware components, each having different functional characteristics and capabilities, and it is likely that portions of the software implementing various aspects of ElderSafe across the distinct hardware components will be implemented in software written for various hardware/CPU architectures (e.g., x86, ARM, RISC-V).

The invention therefore splits ElderSafe functionality into distributed and distinct physical hardware platforms, enabling proving properties on a single platform and then proving end-to-end guarantees across the platforms. However, each monolithic blob on a single platform may be too big to be verified with current verification techniques (e.g., the Linux OS kernel has millions of lines of code). Further, there are different software layers present on a single platform (e.g., firmware, kernel, drivers, applications). Focusing on a single software module to provide those additional capabilities becomes essential for verification. Therefore, the service to which this invention is applied should be able to decompose its components into separate modules, even within software on the same hardware platform.

Modularity and layering can be achieved by breaking a monolithic blobs into a collection of functional, verifiable objects within a platform. For example, on the ElderSafe health-scoring platform, the health-scoring analytics engine and the caregiver tablet signaling interface are broken into verifiable u-object collections. The memory used by each object can be isolated from each other within a u-object collection, control-flow integrity can be enforced, properties about individual objects can be proven (e.g., health-scoring analytics returning a result within a worst-case execution time), and properties about the composition of u-objects on a component can be proven (e.g., health score computed and transmitted to the caregiver tablet from the health scoring platform). Modularity and isolation, as seen in the ElderSafe example, typically involve refactoring code and leveraging hardware capabilities as needed (e.g., de-privileging, virtualization). While some ElderSafe software components, such as OS kernels, are open-source and use open-source development tool-chains (e.g., Linux), other components, such as the BIOS and firmware, use proprietary tool-chains and are binary-only (e.g., the lock firmware). Further, these software components are often independently developed by different developers and are either completely opaque (e.g., the lock firmware) or have partial API visibility (e.g., health-scoring applet). This makes achieving modularity and isolation a challenge and implies an additional goal that the service should accommodate diverse-origin software components and make it possible to ensure all other goals in the presence of partial software visibility and dubious software engineering practices.

Modularity and layering can be achieved while accommodating diverse-origin software and hardware with different capabilities via hybrid isolation. Collections of u-objects can be isolated via verification when having visible, verifiable u-objects in both source and binary. Hardware capabilities (e.g., deprivileging) can be used to isolate collections of u-objects from other untrusted components or trusted but unverified objects. For example, the vitals-monitor application of the ElderSafe service is split into a collection of verifiable objects and isolated from the untrusted OS within the wearable. Unfortunately, this is still insufficient. Some software objects do more than what is needed (e.g., the vitals monitor app includes a GUI subsystem when the only important aspect is the periodic transmission of vital sensor readings). A component contributing to an end-to-end guarantee can be characterized by a function (e.g., a sensor value read within the vitals sensor driver), a collection of functions (e.g., an SSL library), a thread (e.g., a smart door lock control), a process (e.g., a caregiver application) or a virtual machine (e.g., a health-score analytics engine) that in turn interacts with other unverified components for their functionality (e.g., a driver relying on OS kernel support functions). Achieving efficient hybrid isolation in this multi-granular execution environment is challenging. Therefore, resource closure is needed where resources contributing towards an end-to-end guarantee are encapsulated within a u-object at a given granularity (e.g., function, driver, process) with specified interfaces.

Resource closure can be achieved by having a use policy for a verifiable u-object that consists of a specific entry point and wherein the resources the object is allowed to modify can be defined. Properties on the u-object and resource closure can then be proven while isolating everything else via hybrid isolation. For example, the vital sensor hardware can be encapsulated by a u-object within the vital sensor application stack and isolated from the OS.

However, there are multiple u-object collections encapsulating resources, existing on different hardware platforms, which together achieve an end-to-end guarantee (e.g., vitals monitor 102, health-scoring analytics 104, caregiver application 108 and smart lock 106 all contribute towards the guarantee of unlocking the door only when an emergency is detected). Further, these objects can be implemented in different languages (e.g., Java and C for caregiver application, binary or assembly for smart lock firmware), and provide different flavors of properties (e.g., functional, timing), which, in turn. requires different verification tools and methodologies. Using different verification tools often implies different formalizations of hardware environment assumptions such as memory, concurrency and interrupts. For instance, the Frama-C verification tool only models memory as bytes. Therefore, verification tools and methodologies are bridged to connect with each other soundly and help prove and compose properties of different flavors on u-objects running on different hardware environments.

Strict execution entry and exit points for a u-object are enforced and a sound high-level sequential execution abstraction, that is consistent with hardware environment assumptions such as concurrency, pre-emption and memory ordering, for composing objects is extracted. Different verification tools and methodologies are bridged via intermediate verification layers, with hardware environment details (e.g., memory model, instructions, and device interfaces and semantics) tied in, and invariants and properties are proven at the intermediate layers. However, attackers can compromise the unverified portions of the platform software stack preventing verified u-objects from executing in the first place (e.g., smart lock firmware hijacks). Further, an adversary can spoof a device altogether (e.g., unlock the door via a spoofed wearable). Therefore, the invention ensures that platforms are running the correct (verified) u-object collections and ensure that the correct platform is participating in the protocol via a consolidated platform attestation report.

The invention is therefore able to satisfy the goals of provable end-to-end guarantees, practicality and implementation generality. Specifically, heterogeneous hardware is adapted to by splitting the system into per-hardware-device u-object collections, and the verification bridge 600 enables composition of verified u-object collections across hardware differences. Heterogeneous white-box and black-box software is supported via hybrid isolation (through inspection and verification or via hardware confinement); resource interface confinement enables the limitation of the scope of big blobs of supplied software only to the functionality for which it is necessary to incorporate and prove guarantees. The verification bridge 600, besides helping with heterogeneous hardware and their disparate capabilities, also enables the bridging across verification disciplines that tackle different types of properties. Generality and practicality are delivered by a combination of the handling of existing heterogeneous software and hardware, attestation and authentication for trustworthy reporting of verified collections, as well as by our use of language-based and verification-based isolation, rather than solely using hardware de-privileging. Intuitively, the combination of the aforementioned characteristics and challenges that make services such as ElderSafe tricky can be generalized to a broad spectrum of CHIC platform applications, for example, smart-homes, healthcare, smart-grid, autonomous drone deliveries, self-driving cars, etc.

System Architecture

Figure 3:
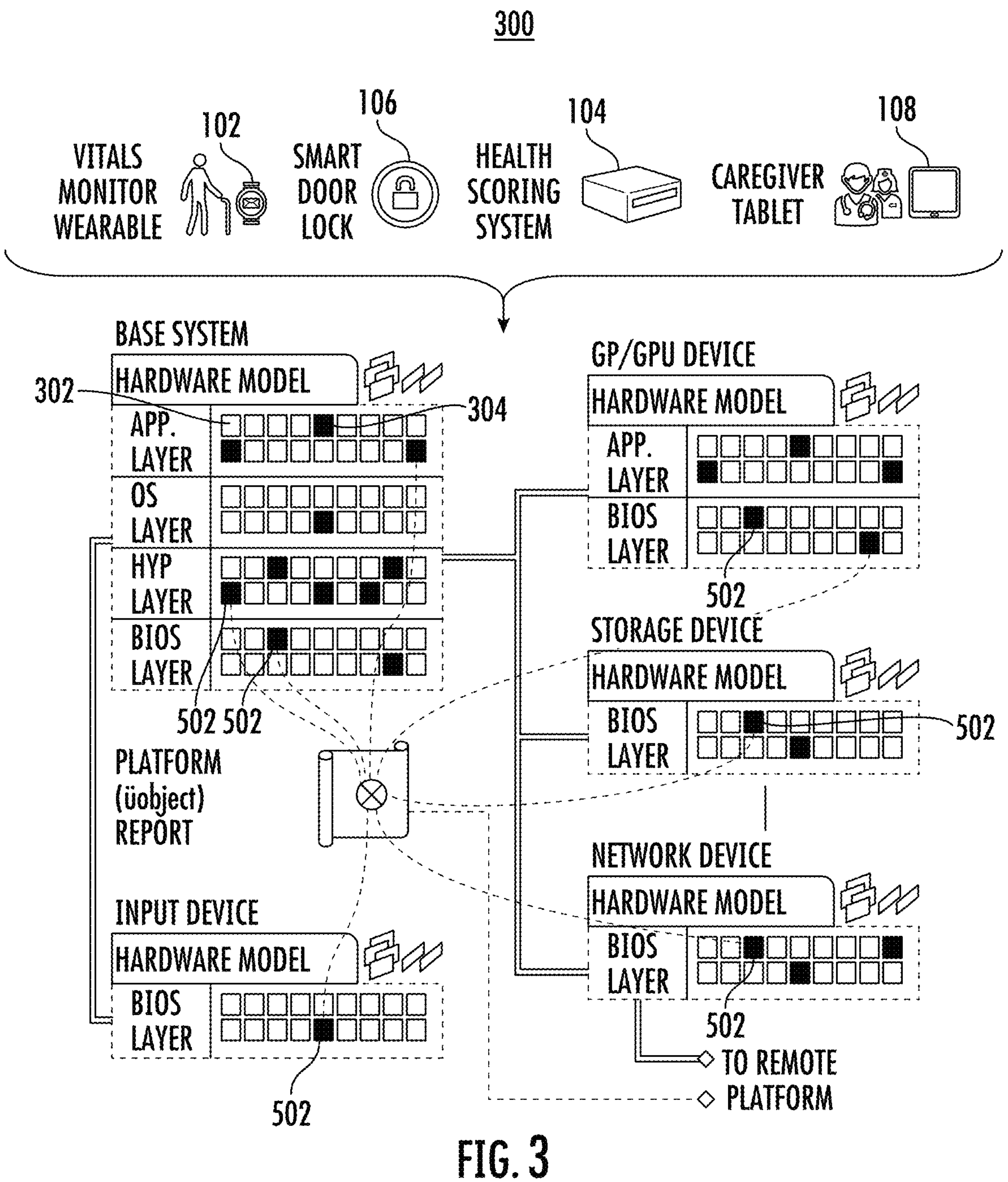
FIG. 3 is a block diagram showing the architecture of the invention.

The architecture 300 of the invention is shown in FIG. 3 and will now be described. The architecture uses a novel micro-multi-kernel design paradigm, which provides practical and provable end-to-end guarantees on CHIC platforms. Every node of the CHIC platform is decomposed into (legacy) unverified components 302 (shown as un-shaded blocks in FIG. 3) and a collection of protected, verifiable, and reportable u-objects 304 (shown as shaded blocks in FIG. 3) that retrofit with the unverified components 302 incrementally, at a fine granularity, and have wide applicability to all layers of the CHIC platform. Note that the architecture shown in FIG. 3 shows only a single component of a distributed platform. For example, the details shown in FIG. 3 could be applicable to any component of the ElderSafe example previously discussed or any other platform. The architecture is designed to support the use of multiple verification techniques towards properties of different flavors, for development compatible, incremental verification, co-existing and meshing with unverified components.

Figure 4:
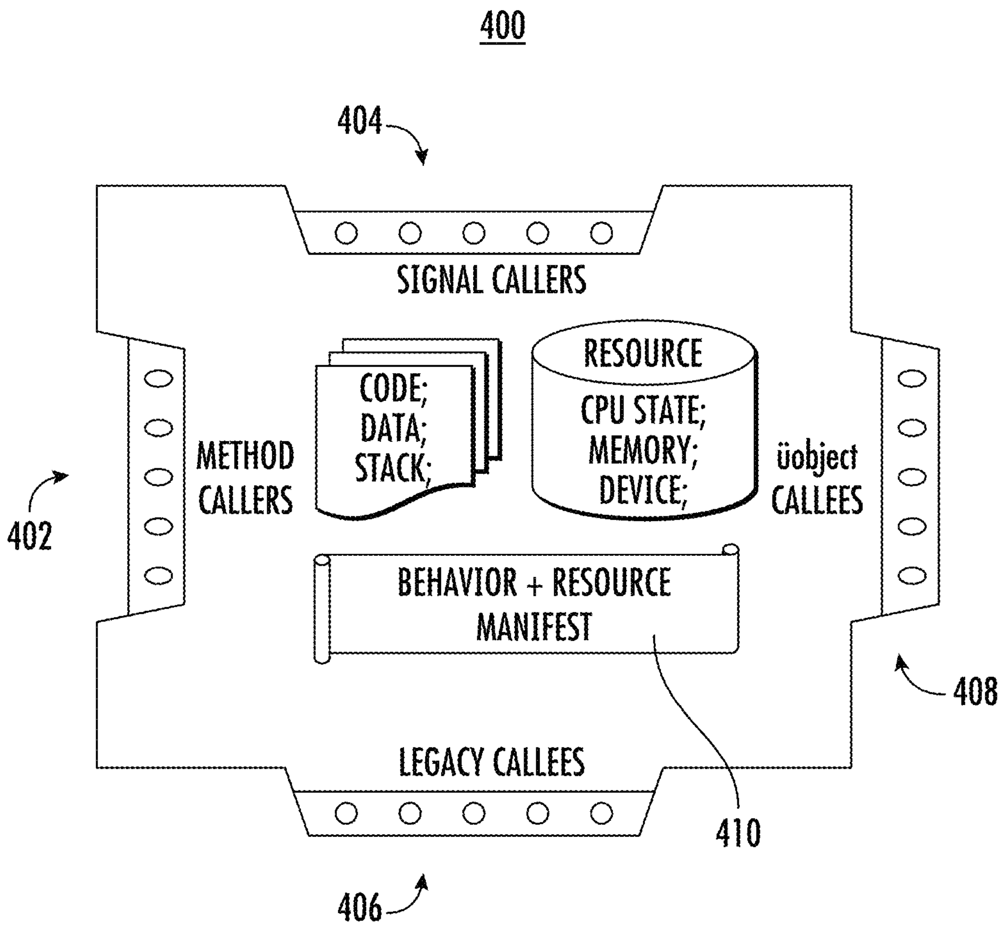
FIG. 4 is a block diagram showing a u-object building block.

U-objects—The logical building blocks of the architecture are referred to herein as u-objects 400. FIG. 4 shows a block diagram of a u-object 400. A u-object 400 is a singleton object guarding some exclusive, indivisible resource such as CPU state and registers, memory, and hardware conduits (hardware signaling and data transfer such as device endpoints, DMA, Mailboxes, etc.).

A u-object 400 implements method callers 402 to access the resource it guards. Method callers 402 are essentially regular function signatures, along with an access-control list (ACL) of allowed callers. In addition, a u-object 400 also implements signal callers 404 to handle signals (interrupts, exceptions, traps, etc.) and legacy callees 406 and u-object callees 408 for principled invocation of legacy, unverified components and other u-objects, respectively.

A u-object 400 is accompanied by a use manifest 410. This consists of a resource specification and an additional formal behavior specification of its own method and signal callers, which guarantees that if some assumptions are satisfied with respect to how a method or signal caller is invoked, then a property on the return value is guaranteed to hold upon return of that method or signal, without mention of internal u-object state. Logical isolation of u-objects may be enforced via typical OS and micro-kernel containers.

Such external enforcement is necessary for u-objects running in different address spaces. However, formally-verified u-objects running in the same address space need no such external enforcement; they enjoy the same isolation, enforced via machine-checked proofs. This achieves the sweet spot between high performance (i.e., there is no hardware de-privileging or message-passing overheads) and compositional verification (i.e., u-objects can be verified separately), even in the presence of other unverifiable (and unavoidable) legacy components.

Figure 5:
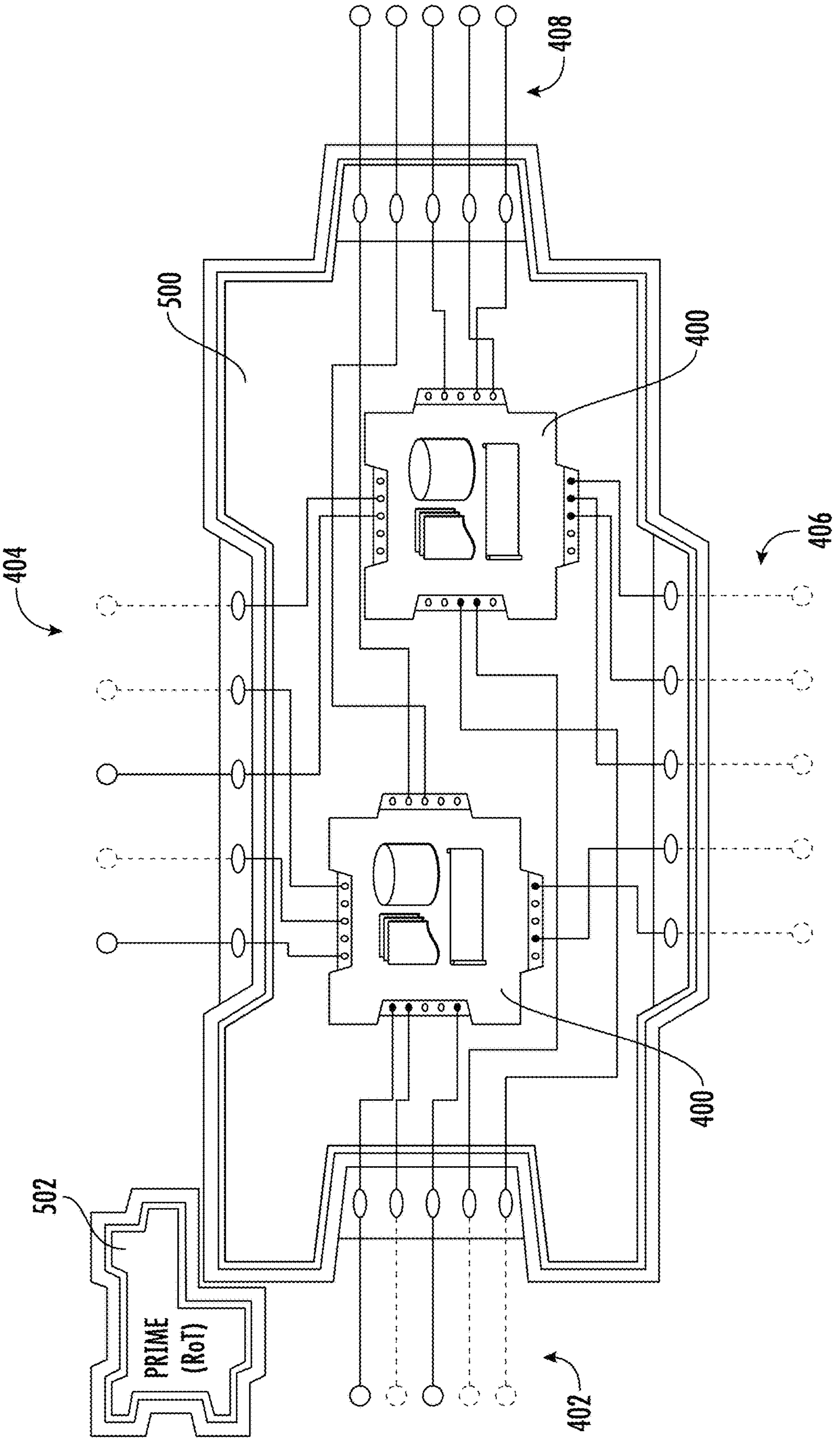
FIG. 5 is a block diagram showing a u-object collection.

U-object Collections—A collection 500 of u-objects 400 is a set of u-objects 400 that share a common memory address space. U-object collections 500 are bridged via hardware conduits (i.e., hardware pathways for signaling and data transfer, e.g., DMA, memory-mapped I/O, etc.) or sentinels, discussed below. FIG. 5 is a block diagram showing a u-object collection 500. Although FIG. 5 shows only 2 u-objects 400 within collection 500, it should be realized that a collection 500 can contain any number of u-objects 400.

A special set of u-objects, called primes 502, serve as a root-of-trust for a u-object collection 500 and are responsible for verifying the memory address space in which the u-objects 400 will execute and for instantiating u-object collections 500 on a given platform within the verified memory address space. In principle, u-object collections 500 can also be nested, modulo the hardware providing necessary conduits (e.g., guest OS u-object collection inside a hardware VM within the base system collection).

Figure 6:
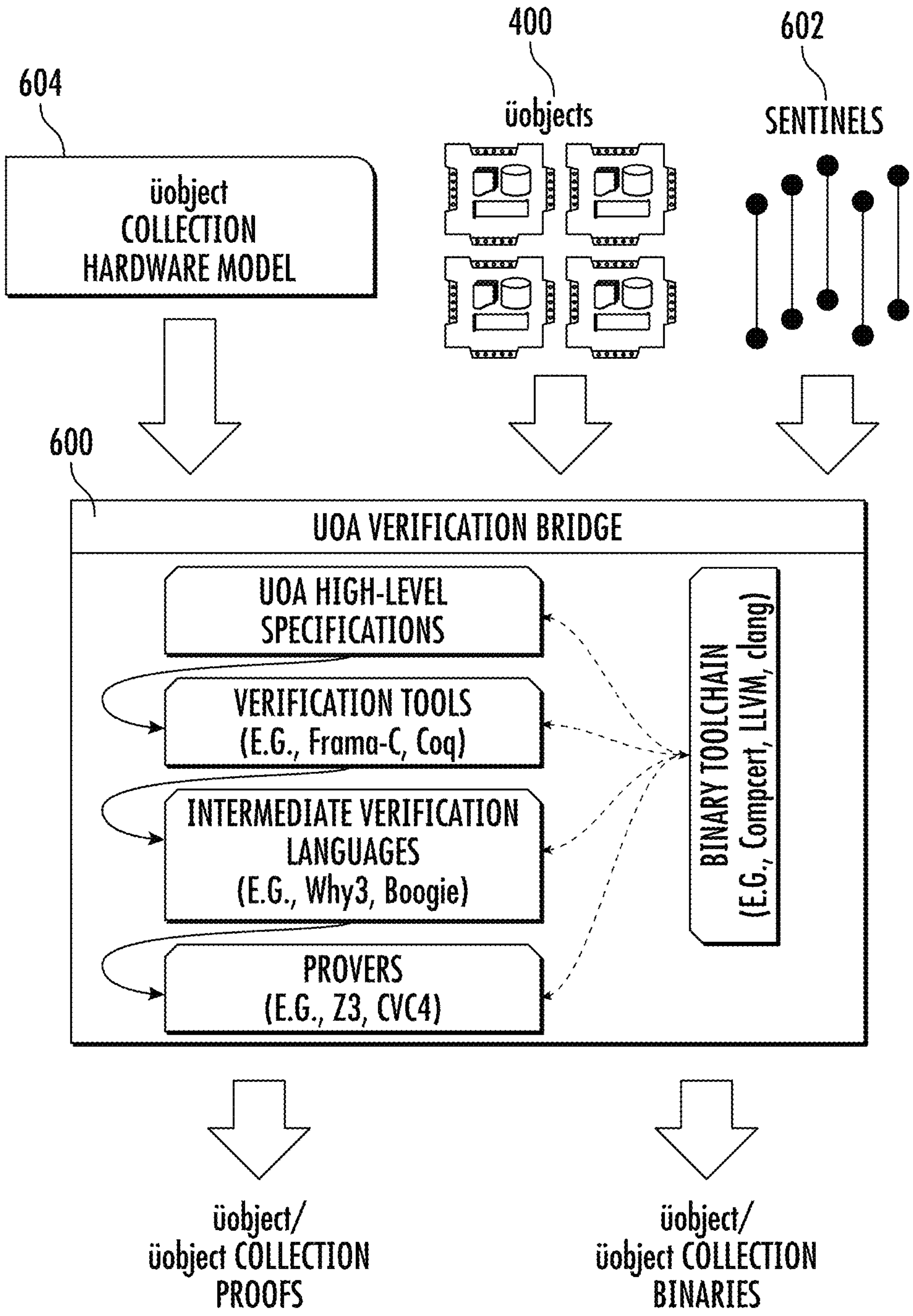
FIG. 6 is a block diagram showing the u-object verification bridge.

Hardware Model—Every u-object collection 500 also has an associated hardware model 604, shown in FIG. 6, formalizing the CPU and modeling the memory and associated hardware conduit end-points. The hardware model 604 is crucial for verifying properties over collections of hardware state (e.g., state of CPU registers and memory) and assertions that are part of the u-object contract within and across u-object collections.

One embodiment of the invention uses a modular and layered hardware model 604 where only the required subset of the hardware is modeled and used during verification (e.g., the hardware model 604 for an Intel SGX-backed u-object is simpler than a u-object executing with hypervisor privileges). This greatly aids verification automation and facilitates validation of the hardware model 604 against real hardware.

Further, the hardware model 604 is preferably specified in an abstract specification language which can then be automatically synthesized down to desired target languages such as C, Java and Coq. This allows the hardware model 604 to be more readily integrated into existing verification toolchains and methodologies that could be employed to verify a u-object 400 written in different programming languages.

U-object collections 500 thus abstract heterogeneous hardware platforms, allowing each collection 500 (along with its u-objects 400) to be verified separately down to the hardware state while allowing composition of such verified properties across collections.

U-object Resource Interface Confinement—Every u-object 400 includes a resource specification within its manifest 410 that describes sensitive resources that it may access (e.g., code, data, stack, global system data, CPU state and collection hardware conduit end-points). U-objects 400 are held to their resource specification via a combination of hardware and/or software mechanisms. The invention employs the u-object collection hardware model 604 identifying CPU interfaces to u-object resources (e.g., designated instructions) and software verification to ensure that access to those interfaces respects the manifest of the u-object 400.

Alternatively, hardware mechanisms (e.g., MMU, privilege protections) and/or binary manipulations can be leveraged to hold u-objects to their resource specification. The resource interface confinement thus supports shared memory concurrency and linearizability by allowing distinct system resources to be: (a) managed by designated u-objects 400; (b) protected from access by unauthorized u-objects 400 or legacy components 302; and (c) regulated in their invocation via method callers by authorized client u-objects 400 or legacy components 302.

The aforementioned capabilities, enabled by u-object resource interface confinement, in conjunction with u-object execution and interaction mechanisms, facilitate assume-guarantee style reasoning and composition of verified properties on the CHIC platform, while allowing efficient multi-threaded executions.

U-object Instantiation and Execution—A u-object 400 can be statically or dynamically instantiated. The prime u-objects 502, are responsible for boot-strapping the execution of u-objects 400 within a given u-object collection 500. Primes 502 can employ different isolation mechanisms such as software fault isolation and hardware-assisted containerization to instantiate u-object collections 500 in a protected manner. Primes 502 also initialize the u-object collection CPUs, operating stacks, and policies before kick-starting interactions between u-objects 400. A prime 502 may employ, for example, a hypervisor of the type described in U.S. Pat. No. 8,627,414 to secure and verify a memory address space in which a u-object collection 500 is instantiated and executed.

A u-object 400 may be concurrent or sequential. The invention decouples execution threads from execution domains (i.e., an execution trace can span multiple u-objects 400 across multiple collections 500). U-objects 400 can also incur hardware signals such as traps, exceptions, or interrupts. In such cases, hardware capabilities are employed to save the current u-object state before handling the signal, either within the source u-object (via signal callers 404) or other u-objects 400 by employing sentinels 602. Once the signal is processed, the source u-object 400 is resumed once again via sentinels (discussed below).

This design enables the abstraction of concurrent and asynchronous u-object executions as sequential interleavings facilitating verification (e.g., contextual refinement), while supporting the use of commodity signal and threading mechanisms (e.g., deferred procedure calls, user-mode and kernel-mode preemptive threading, light-weight non-preemptive threading etc.).

U-object Interactions—U-object interactions can be divided into intra-collection 402 inter-collection 408 and legacy component 302 invocations. Intra-u-object collection interactions occur via u-object callees 408 while legacy invocations occur via legacy callees 406.

Such interactions model function call-return semantics using a combination of hardware capabilities and software verification. This enables compositional reasoning of the u-object properties (i.e., allows properties of u-objects 400 to be specified in terms of their interactions with other u-objects 400 and u-object collections 500, yet being able to verify those properties separately on each u-object 400 in isolation, while meshing with (legacy) unverified components 302 at the desired granularity). U-object interactions can happen via software and/or hardware conduits and are facilitated by the sentinel abstraction, as described below. In some embodiments, communication between u-objects executing in different address spaces may be encrypted, whereas communication between u-objects executing in the same address spaces may be unencrypted.

Sentinels—Sentinels 602, shown in FIG. 6, mediate u-object interactions and ensure that the caller may invoke a given u-object method on the callee, according to the u-object manifest 410. If caller and callee are both verified, then no runtime check is required because u-object verification enforces the call policy. This results in efficient runtime performance (e.g., no hardware de-privileging overhead). If either the caller or the callee is unverified, the sentinel consults the policy dynamically and allows or rejects the call accordingly.

In addition to the runtime checks, sentinels 602 are responsible for transferring control among u-objects 400, switching stacks, and handling hardware signals by employing the appropriate control-transfer method for the isolation mechanism imposed on the u-object 400. For example, if two u-objects 400 are both verified and have the same isolation mechanism, then the control transfer is just a function call. But if one has a different isolation mechanism (e.g., hardware segmentation), then the sentinel 602 implements the control transfer leveraging the appropriate hardware capabilities (e.g., for segmentation, switches privilege levels, stacks, and marshals arguments).

Similarly, for hardware signals, the sentinel 602 employs the appropriate hardware capabilities (e.g., trap state areas) to handle the signal either within the source u-object 400 or by passing control to another u-object 400. Sentinels 602 can also be realized using hardware conduits such as legacy I/O, memory-mapped I/O, DMA, and mailboxes. In such cases, interactions are enforced via u-object resource interface confinement.

U-object Verification Bridge—The execution of u-objects 400 relies foundationally on a set of properties that must hold throughout the execution of the u-object 400: (a) u-object base invariants; and (b) u-object-specific properties.

U-object base invariants are properties that need to hold regardless of what the u-object 400 implements and which include memory safety, memory integrity and (internal) control flow integrity. These invariants include ensuring correct stack frame setup and teardown, ensuring the absence of buffer overflows, (otherwise returns could land at arbitrary u-object program sites), parameter marshaling, routing of external calls via sentinels, privilege-level enforcement, etc.

U-object base invariants make assume-guarantee reasoning on the CHIC platform tractable and make it possible for u-object code to be reasoned about in a compositional manner. The base invariants are also designed to be verified automatically, without developer assistance (e.g., using abstract interpretation techniques or binary-level enforcement) to allow retrofitting u-objects 400 into an existing legacy unverified codebase with minimal effort.

U-object-specific properties, on the other hand, depend on the desired end-to-end guarantees, the resources that the u-object 400 encapsulates, and the u-object 400 implementation.

The u-object verification bridge 600, shown in FIG. 6, is based on the key observation that a vast majority of state-of-the-art formal analysis tools integrate with (inter-convertible) common verification languages. However, existing intermediate languages do not capture both software and hardware requirements expressively. Therefore, the invention defines a high-level abstract specification language for the u-object invariants and u-object execution semantics including sentinels 602, resource confinement, and the collection hardware model 604.

The verification bridge 600 translates the u-object invariants and execution semantics to an existing intermediate verification language and/or specification, which can then be used by a specific verification tool and/or methodology to prove various classes of u-object-specific properties, including properties over hardware states.

U-object Reporting—The invention also enables collecting and reporting measurements (e.g., SHA-1, property based attestation, etc.) of u-object instantiations within and across platforms. This ensures that platforms are running the correct stack of (verified) u-object collections 500. The primes 502, which instantiate u-object collections 500, are also responsible for collecting and reporting u-object measurements. There can be multiple primes 502 across multiple collections 500 within a given platform chaining together collection measurements (See FIG. 3); a root-prime forms the root-of-trust for measurements in such cases. In one embodiment, measurements may comprise, for example, a stored chain of secure hashes of the memory block that cannot be tampered with.

Root-of-trust within a prime can be implemented entirely in software (e.g., via static root-of-trust and software trusted platform module (TPM)), entirely in hardware (e.g., via dynamic root-of-trust and hardware TPM), or a combination of hardware and software (e.g., static root-of-trust and hardware TPM).

In some embodiments, the primes 502 can also be extended to allow u-object instantiation via white-listing and to provide physical platform authentication using an external verifier in the form of software-based attestation.

ElderSafe Implementation—The described architecture, as instantiated on the exemplary ElderSafe service will now be discussed. Because there are four distinct CHIC hardware platforms involved in ElderSafe, as shown in FIG. 1, there are four corresponding prime u-object collections 500, one for each of the smart lock 106, the wearable vitals monitor 102, the health scoring workstation 104, and the caregiver's tablet 108.

Depending on the platform hardware capabilities, each prime u-object collection is responsible for establishing either a static root-of-trust (e.g., wearable vitals monitor 102, smart lock 106) and/or a dynamic root-of-trust (e.g., on the health scoring system 104 and caregiver's tablet 108), which may be co-tenant with other software on the platform on which it executes. An additional prime u-object collection deals with the static root-of-trust on the health scoring workstation GPU. The choice of static or dynamic roots-of-trust is generally dependent on the hardware platform capability.

Each prime u-object collection manages corresponding u-object collections 500 within the underlying hardware platform. For example, zooming in on the wearable platform 102, the prime 502 manages one u-object collection 500 each for the vital-sensing application, the sensing-hardware driver within the OS, as well as the platform collections supporting the boot-up firmware, while reporting on other software and the hardware state. These are distinct collections because they handle different high-level functionalities and resources and may be isolated within different verified memory address spaces.

The prime also takes care to create these u-object collections 500 (and their constituent u-objects 400) within the right isolation container: the vitals-monitoring application is vast and proprietary, so it must be contained via a combination of software verification and hardware de-privileging, whereas the boot-up firmware can be verified and need not be virtualized or otherwise isolated via hardware mechanisms.

Although the prime 502 of the wearable platform 102 creates these u-object collections 500, a number of sentinels 602 on the platform handle on-going u-object interactions: u-object-to-u-object calls within each collection, measurement calls for attestation, inter-process or multi-processor communication calls across address spaces and cores, respectively, etc.

Importantly, the vitals-monitoring application u-object collection 500 is especially needful of its sentinel 602 because it must filter out the vast functionality of the vitals-monitoring application, including a GUI, and only keep the few sensing APIs needed by the ElderSafe service. The sentinels 602 enforce resource interface confinement on this application, only allowing information about the needed sensor readings, and therefore achieving resource closure.

Providing guarantees (security and functional) on the wearable u-object collections 500 requires bridging hardware abstractions on the ARM platform and the memory abstractions of the C/Java runtime executing the vitals-monitoring application. For example, to provide real-time guarantees about the delivery of a sensed signal to collections on a different platform (e.g., the health-scoring application 104 on the workstation), the verification bridge 600 must expose the concurrency model to a worst-case execution-time framework.

Although this is a brief description of the primitives of the invention in the context of ElderSafe, they demonstrate how the architecture makes it tractable to reason about a complex CHIC system design yet adhere to the desired design goals as specified in the Summary section above.

System Architecture Implementation

The salient system architecture implementation details involving the creation and verification of u-objects and enforcing u-object resource interface confinement will now be discussed.

Creation of u-objects—U-objects 300 can be created from the existing CHIC stack by identifying the resources being isolated towards a specific property, and then paring away code that closely operates on such resources. The invention can readily benefit from program slicing, data dependency analysis, and program synthesis to automatically identify such code fragments for common languages such as C, C++, and Java. For binary-only components, the invention can leverage binary analysis platforms to locate, slice, and stitch together such code fragments. Machine learning techniques for optimizing existing binary code for a purpose or forms of summarization and question answering may be used to accomplish this task.

Verification of u-objects—For open-source u-objects 300 that are written in common languages, the invention employs refinement proofs, source-code level verification and push-button style verification to prove u-object properties. Additionally, for some languages (e.g., C, assembly, ML), the invention can leverage certified compilers, certified parsers and code generation frameworks, in association with proven-correct assemblers, to translate verified properties into proven-correct binaries. For languages unable to benefit from such schemes or for binary-only u-objects 300, the invention allows instrumenting the resulting binary code with assertions satisfying required properties. Similarly, for concurrent u-objects 300, contextual refinement can be employed while sequential u-objects 300 can be reasoned with Hoare logic.

U-object Resource Interface Confinement (RIC)—The invention employs hardware capabilities such as IOMMU and MMU for RIC of memory and devices; hardware de-privileging can be used for RIC of CPU instructions. Where performance is key or where hardware has limited capabilities, the invention uses model-checking, abstract program interpretation, and software fault isolation to achieve RIC at both source and binary levels. Finally, the invention leverages (and informs) hardware breakpoints as well as hardware-assisted instruction level guards to enforce efficient fine-grained RIC.

As would be realized by one of skill in the art, the disclosed method described herein can be implemented by a system comprising a processor and memory, storing software that, when executed by the processor, performs the functions comprising the method.

As would further be realized by one of skill in the art, many variations on implementations discussed herein which fall within the scope of the invention are possible. Moreover, it is to be understood that the features of the various embodiments described herein were not mutually exclusive and can exist in various combinations and permutations, even if such combinations or permutations were not made express herein, without departing from the spirit and scope of the invention. Accordingly, the method and apparatus disclosed herein are not to be taken as limitations on the invention but as an illustration thereof. The scope of the invention is defined by the claims which follow.

The invention claimed is:

1. A heterogeneous computing platform, comprising:

one or more u-objects guarding one or more resources of the heterogeneous computing platform, each u-object executing in a memory block and comprising:

a method caller interface via which the resource protected by a u-object can be accessed;

a u-object callee interface configured to enable a u-object access to other u-objects;

a legacy callee interface wherein the u-objects can access unsecured portions of the heterogeneous computing platform; and a signal caller interface to handle signals.

2. The heterogeneous computing platform of claim 1 further comprising:

one or more unverified components, the one or more u-objects retrofit with the one or more unverified components.

3. The heterogeneous computing platform of claim 1 further comprising:

a prime object acting as a root-of-trust to protect and report on the one or more u-objects;

wherein the prime object verifies a memory address space on the heterogeneous computing platform and instantiates the u-objects for the heterogeneous computing platform in the verified memory address space.

4. The heterogeneous computing platform of claim 3 wherein the prime object initializes a CPU on which the one or more u-objects execute and initializes operating stacks and policies for the u-objects before starting execution of the u-objects.

5. The heterogeneous computing platform of claim 4 wherein the prime object secures and measures the verified memory address space using a static root-of-trust and a software TPM, a dynamic root-of-trust and a hardware TPM, or a combination of a static root-of-trust and a hardware TPM.

6. The heterogeneous computing platform claim 1 wherein each u-object further comprises:

an access control list of allowed callers indicating allowed callers for each resource protected by the u-object.

7. The heterogeneous computing platform of claim 1 wherein each u-object is defined by a resource specification and a behavior specification which guarantee that, if one or more conditions regarding how the method caller or signal caller interface are invoked, then a property of a return value is guaranteed to hold;

wherein the resource specification describes security-sensitive resources which may be accessed by methods of the u-object.

8. The heterogeneous computing platform of claim 1 further comprising:

one or more sentinels, realized in hardware, software or a combination of hardware and software;

wherein the one or more sentinels enforce an access control list for each u-object.

9. The heterogeneous computing platform of claim 8 wherein u-objects can invoke other u-objects within a u-object collection or across u-object collections and can invoke legacy components via the sentinels, wherein the sentinels enforce control transfer while ensuring an appropriate isolation mechanism (hardware vs software) and operating stacks.

10. The heterogeneous computing platform of claim 1:

wherein each u-object includes a set of base invariants that hold regardless of the functions performed by methods of the u-object; and wherein each u-object includes a set of u-object-specific properties that are maintained throughout execution of the methods of the u-object.

11. The heterogeneous computing platform of claim 1 wherein a plurality of u-objects forming a collection share a secured and verified memory block and are instantiated by a common prime object.

12. The heterogeneous computing platform of claim 11 wherein collections of u-objects may be nested within other collections of u-objects.

13. The heterogeneous computing platform of claim 3 wherein communications between u-objects executing in different verified memory address spaces are encrypted.

14. The heterogeneous computing platform of claim 1 wherein each u-object handles traps, exceptions and interrupts via its respective signal caller interface.

15. The heterogeneous computing platform of claim 1 wherein u-objects and u-object collections can be statically or dynamically instantiated at runtime.

16. A cyber-physical system having provable end-to-end guarantees comprising:

two or more of the heterogeneous computing platforms of claim 1;

wherein a collection of prime objects across the heterogeneous computing platforms protect and report on the one or more u-objects within and across the heterogeneous computing platforms, thereby contributing to end-to-end guarantees at runtime.

17. The cyber-physical system of claim 16 further comprising:

a verification bridge to facilitate assume-guarantee style modular formal reasoning on system object implementations across the two or more heterogeneous computing platforms.

18. The cyber-physical system of claim 16 further comprising:

a reporting framework;

wherein the prime objects across the two or more heterogeneous computing platforms collect and report measurements of executing resources at runtime.

19. The cyber-physical system of claim 17 wherein the verification bridge uses a high level modular provable specification language to capture object invariants and properties including the execution semantics of the u-objects, one or more sentinels, resource encapsulation and hardware model.

20. The cyber-physical system of claim 18, further comprising:

a root-prime object;

wherein prime objects which instantiate the u-objects collect and report measurements of the u-objects both within and across the two or more heterogeneous computing platforms; and wherein the root-prime object forms an absolute root-of-trust for the measurements.

* * * * *